US006850999B1

(12) United States Patent
Mak et al.

(10) Patent No.: US 6,850,999 B1
(45) Date of Patent: Feb. 1, 2005

(54) COHERENCY COVERAGE OF DATA ACROSS MULTIPLE PACKETS VARYING IN SIZES

(75) Inventors: Kwok Ken Mak, Chapel Hill, NC (US); Xiaoming Sun, Chapel Hill, NC (US)

(73) Assignee: Cisco Technology, Inc., San Jose, CA (US)

( * ) Notice: Subject to any disclaimer, the term of this patent is extended or adjusted under 35 U.S.C. 154(b) by 252 days.

(21) Appl. No.: 10/306,009

(22) Filed: Nov. 27, 2002

(51) Int. Cl.$^7$ .......................... G06F 13/18; G06F 12/04
(52) U.S. Cl. .......................... 710/39; 710/55; 370/412; 370/413; 712/210; 711/208
(58) Field of Search .............................. 710/30, 36, 39, 710/52, 53, 54, 55, 112, 244; 711/212, 206, 208; 370/395.1, 412, 413; 712/210

(56) References Cited

U.S. PATENT DOCUMENTS

| | | | | |
|---|---|---|---|---|
| 5,155,843 A | * | 10/1992 | Stamm et al. .................. | 714/5 |
| 5,224,214 A | | 6/1993 | Rosich | |
| 5,317,720 A | * | 5/1994 | Stamm et al. ............... | 711/143 |
| 5,333,296 A | * | 7/1994 | Bouchard et al. ............ | 711/171 |
| 5,572,522 A | * | 11/1996 | Calamvokis et al. ........ | 370/390 |
| 5,592,476 A | * | 1/1997 | Calamvokis et al. ........ | 370/390 |
| 5,809,320 A | * | 9/1998 | Jain et al. ...................... | 712/34 |
| 5,948,100 A | * | 9/1999 | Hsu et al. .................... | 712/238 |
| 6,035,387 A | * | 3/2000 | Hsu et al. .................... | 712/210 |
| 6,078,532 A | | 6/2000 | Rivers et al. | |
| 6,091,725 A | | 7/2000 | Cheriton et al. | |
| 6,147,996 A | | 11/2000 | Laor et al. | |
| 6,201,729 B1 | | 3/2001 | Rivers | |
| 6,212,613 B1 | | 4/2001 | Belair | |
| 6,230,241 B1 | | 5/2001 | McKenney | |
| 6,236,658 B1 | | 5/2001 | Essbaum et al. | |
| 6,240,461 B1 | | 5/2001 | Cieslak et al. | |
| 6,330,645 B1 | | 12/2001 | Harriman | |
| 6,345,294 B1 | | 2/2002 | O'Toole et al. | |
| 6,574,232 B1 | * | 6/2003 | Honig et al. ................. | 370/413 |

OTHER PUBLICATIONS

Iyer, S. et al., "Analysis of a Memory Architecture for Fast Packet Buffers", Workshop on High Performance Switching and Routing, IEEE (c) 2001.

* cited by examiner

*Primary Examiner*—B. James Peikari
(74) *Attorney, Agent, or Firm*—Cesari and McKenna, LLP; A. Sidney Johnston (57) ABSTRACT

A coherency resolution technique enables efficient resolution of data coherency for packet data associated with a service queue of an intermediate network node. The packet data is enqueued on a write buffer prior to being stored on an external packet memory of a packet memory system. The packet data may be interspersed among other packets of data from different service queues, wherein the packets are of differing sizes. In response to a read request for the packet data, a coherency operation is performed by coherency resolution logic on the data in the write buffer to determine if any of its enqueued data can be used to service the request.

21 Claims, 6 Drawing Sheets

COHERENCY COVERAGE OF DATA ACROSS MULTIPLE PACKETS VARYING IN SIZES

FIELD OF THE INVENTION

The invention relates generally to networking devices and, more specifically, to ensuring coherency of data processed by a networking device, such as an intermediate network node.

BACKGROUND OF THE INVENTION

A computer network is a geographically distributed collection of interconnected communication links for transporting data between nodes, such as computers. Many types of computer networks are available, with the types ranging from local area networks (LANs) to wide area networks (WANs). The nodes typically communicate by exchanging discrete frames or packets of data according to pre-defined protocols, such as the Transmission Control Protocol/Internet Protocol (TCP/IP) or the Internetwork Packet exchange (IPX) protocol.

The topology of a computer network can vary greatly. For example, the topology may comprise a single LAN containing a single intermediate node of a type such as, e.g., a hub, with end nodes attached to the hub. A more complex network may contain one or more local area networks interconnected through a complex intermediate internetwork comprising a plurality of other types of intermediate nodes, such as switches or routers, to form a WAN. Each of these latter intermediate network nodes typically contain a processor that enables the intermediate node to inter alia, route or switch the packets of data along the interconnected links from e.g., a source end node that originates the data to a destination end node that is designated to receive the data. Often, these intermediate network nodes employ packet buffers to temporarily hold packets that are processed by the nodes.

Packet buffers often comprise one or more memory devices that are arranged to form one or more first-in first-out (FIFO) queues, where each queue may have a level (class) of service associated with a particular input or output line. The size of each "service" queue often depends on the rate of the line associated with the queue, as well as the time it takes for a packet to be processed by the intermediate network node. For example, assume an input line on an intermediate node has a line rate of 1 Gigabits per second (Gb/s) and a packet takes 250 milliseconds (ms) to be processed by the node. The service queue size can be determined by multiplying the line rate times the processing rate, thus yielding a queue size of at least 250 megabits (Mb).

In addition to the processor, the intermediate network node may comprise a packet memory system and an input/output (I/O) system. Packet data is transferred between the packet memory, processor and I/O system over an interconnect, such as a bus, comprising address, data and control lines, with the control lines carrying control signals specifying the direction and type of transfer. For example, the processor (i.e., a requestor) may issue a read command request over the bus to retrieve packet data from an addressed location in the packet memory coupled to the processor. The processor may thereafter issue a write command request to store additional packet data in the same or another addressed location in the memory system.

The speed of the memory read request impacts the throughput of the intermediate node because resources of the node, such as the processor, often cannot continue operating until they receive the requested information. The speed of the memory write request, however, is not as significant since the processor does not immediately need the write data once it is written to the memory system. As a result, the intermediate node may include a write buffer configured to store write data associated with write requests destined for the packet memory. Use of the write buffer enables write operations to the memory to occur at efficient times, while further enabling read operations to be serviced before write operations. In addition, use of the write buffer between the memory system and processor reduces the amount of flow control to the processor. For example, use of the write buffer reduces the possibility that a memory controller may need to exert flow control to a requester, such as the processor, because it could not accept more write data.

In a typical memory system employing a write buffer, data coherency plays an important role to ensure that the latest data are delivered to the requester. In this context, data coherency is defined as ensuring that all copies of a data set always reflect the same, and most current, data values. One approach to resolving data coherency in such a memory system is at a common data size. This often occurs when the "particle" size of data stored (written) to the packet memory is the same size as the data retrieved (read) from the memory. However, this approach is not very "user friendly" with typical network traffic, where the size of a packet varies. Resolving coherency of the packet data at a common particle size may require multiple interrogations until the overall amount of requested data is satisfied. Such an approach may further result in lengthy resolutions, thus stalling resource utilization of the intermediate node.

For example, multiple data packets differing in sizes from a service queue may be stored (i.e., enqueued) on a write buffer before being written to a packet memory. These packets may be interspersed in the write buffer among other packets of differing sizes from other service queues. As a function of quality of service (QoS), an operation issued by a requestor to retrieve data packets for a service queue may request a plurality (e.g., thousands) of bytes from the packet memory system, where a sizable portion of the requested data is located on the write buffer, enveloped among many interspersed packets. Accordingly, certain data packets may need to be retrieved (i.e., dequeued) from the write buffer to satisfy the request.

If the particle size of the packet memory is relatively small, e.g., 32 bytes, a conventional coherency state machine would need to interrogate the contents of the write buffer hundreds of times, each interrogation occurring at a 32-byte particle size granularity, until all of the requested dequeue data is satisfied. While it may take a single cycle to transfer 32 bytes of data during normal operation, resolving coherency for each 32-byte particle of data in the write buffer can take many cycles, which may adversely impact the output rate of the service queue. Until the entire coherency resolution is complete, the latency associated with the service queue can block dequeue operations of other packets on other service queues located behind that queue.

One solution to this approach is to "manually flush" the entire contents of the write buffer to packet memory, retrieve the requested data from the memory and then relay that data to the requestor. However, if the size of the write buffer is relatively large, this solution may take a long time, which could degrade performance of the system. The solution may be extended to store write commands up to a predetermined threshold before flushing those commands. Once the commands are flushed, the corresponding data from the write buffer has already been written to memory. This is similar to waiting for the write buffer to flush itself naturally. Another solution is to perform full lookup operations on a particle size, e.g., 32-byte, basis; however, this latter solution also incurs latency, which may degrade performance.

SUMMARY OF THE INVENTION

The present invention overcomes the disadvantages of the prior art by providing a technique that enables efficient resolution of data coherency for packet data associated with a service queue of an intermediate network node. The packet data is enqueued on a write buffer of a packet memory system prior to being stored on an external packet memory. The packet data may be interspersed among other packets of data from different service queues, wherein the packets are of differing sizes. In response to a read request for the packet data, a coherency operation is performed by coherency resolution logic on the data in the write buffer to determine if any of its enqueued data can be used to service the request.

The coherency resolution logic comprises a coherency table having a plurality of entries, each associated with a write (enqueue) command request and write data for a packet or portion of a packet. A coherency resolution controller generates a snapshot table to enable coherency resolution when the address and length of an incoming read (dequeue) command request match that of an enqueued command for packet data pending in the write buffer. The snapshot table provides a means for capturing an instance of the information needed to perform the coherency operation, while enabling the coherency table to continue to accept incoming write requests if there are available entries to accommodate those requests.

According to the inventive technique, the coherency operation is performed on a range of addresses rather than at a predetermined memory particle size granule. Where the range of addresses includes multiple packets, coherency resolution is performed for the multiple packets in a "seamless" manner. That is, once data corresponding to a packet in the range of matching addresses is retrieved from the write buffer, the data of a next packet in the write buffer is immediately retrieved without any pause or gaps between retrievals. Rather than tagging the enqueue data on the memory particle size granule, the coherency resolution logic interrogates the write buffer once and seamlessly "bursts" relevant data from the write buffer at maximum rate until the entire requested data is satisfied.

Advantageously, the inventive technique simplifies data coherency and reduces the impact on performance that typically occurs with coherency operations. Coherency checking does not have to be performed on the memory particle size granularity because each enqueue command issued to the packet memory system for a packet of a service queue has a starting address and length, and the corresponding data is stored contiguously in the write buffer (and memory). When a next packet arrives for the same service queue, that packet is stored in a location following the previous packet of that service queue. Thus, in response to a dequeue command for a packet, the novel technique enables efficient resolution of data coherency even though there may be other service queue packets interspersed in the write buffer that are destined for other memory locations.

BRIEF DESCRIPTION OF THE DRAWINGS

The above and further advantages of invention may be better understood by referring to the following description in conjunction with the accompanying drawings in which like reference numerals indicate identical or functionally similar elements.

DETAILED DESCRIPTION OF AN ILLUSTRATIVE EMBODIMENT

Figure 1:
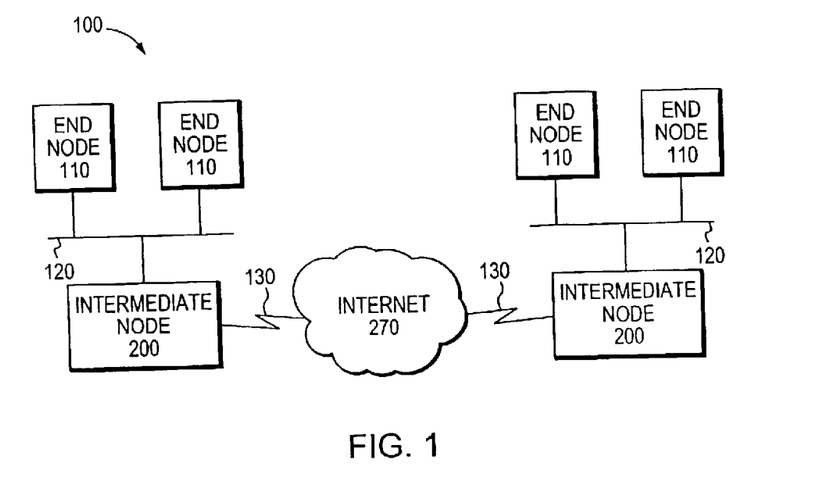
FIG. 1 is a schematic block diagram of a network that can be advantageously used with the present invention.

FIG. 1 is a schematic block diagram of a computer network 100 that can be advantageously used with the present invention. The computer network 100 comprises a collection of communication links and segments connected to a plurality of nodes, such as end nodes 110 and intermediate network nodes 200. The network links and segments may comprise local area networks (LANs) 120, wide area networks (WANs) such as Internet 270 and WAN links 130 interconnected by intermediate nodes 200, such as network switches or routers, to form an internetwork of computer nodes. These internetworked nodes communicate by exchanging data packets according to a predefined set of protocols, such as the Transmission Control Protocol/Internet Protocol (TCP/IP) and the Internetwork Packet eXchange (IPX) protocol.

Figure 2:
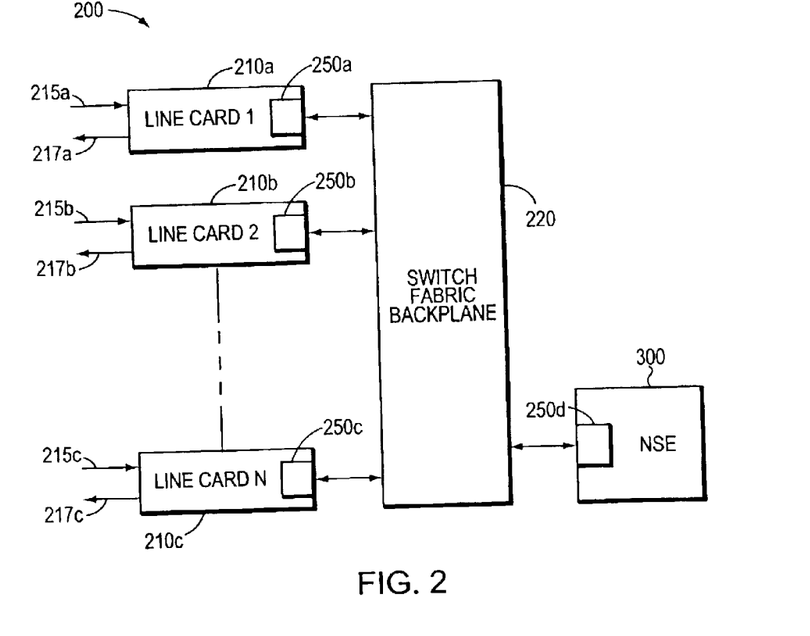
FIG. 2 is a partial schematic block diagram of an intermediate network node that can be advantageously used with the present invention.

FIG. 2 is a partial block diagram of intermediate network node 200. An example of an intermediate node that can be advantageously used with the present invention is the Cisco 7300 Router available from Cisco Systems, Incorporated, San Jose, Calif. The illustrative intermediate node 200 is a compact, mid-range router that provides high availability and performance, and delivers high-touch IP services at optical speeds. Intermediate network node 200 supports various combinations of communication protocols including, e.g., Asynchronous Transmission Mode (ATM), Ethernet, Fast Ethernet, Gigabit Ethernet and multi-channel T3. The intermediate node 200 comprises a plurality of cards including line cards 210 and a network services engine (NSE) card 300 interconnected by a switch fabric backplane 220 (hereinafter "backplane 220"). Each card has a backplane interface 250 that connects the card to the backplane 220 to thereby enable sending and receiving of various data and control signals between the card and backplane.

The line cards 210 connect (interface) the intermediate node 200, which may alternatively be configured as a switch, with the network 100. To that end, the line cards 210 receive and transmit data over the network through input ports 215 and output ports 217, respectively, using various protocols such as, e.g., OC-3 up to OC-192, Fast Ethernet, T3. The line cards 210 also forward data received from the network 100 to the backplane 220, as well as transmit data received from the backplane 220 to the network 100. The backplane 220 comprises logic and point-to-point interconnections that provide an interface between the line cards 210 and the NSE 300. That is, the backplane 220 provides interconnections between the cards that allow data and signals to be transferred among the cards.

Figure 3:
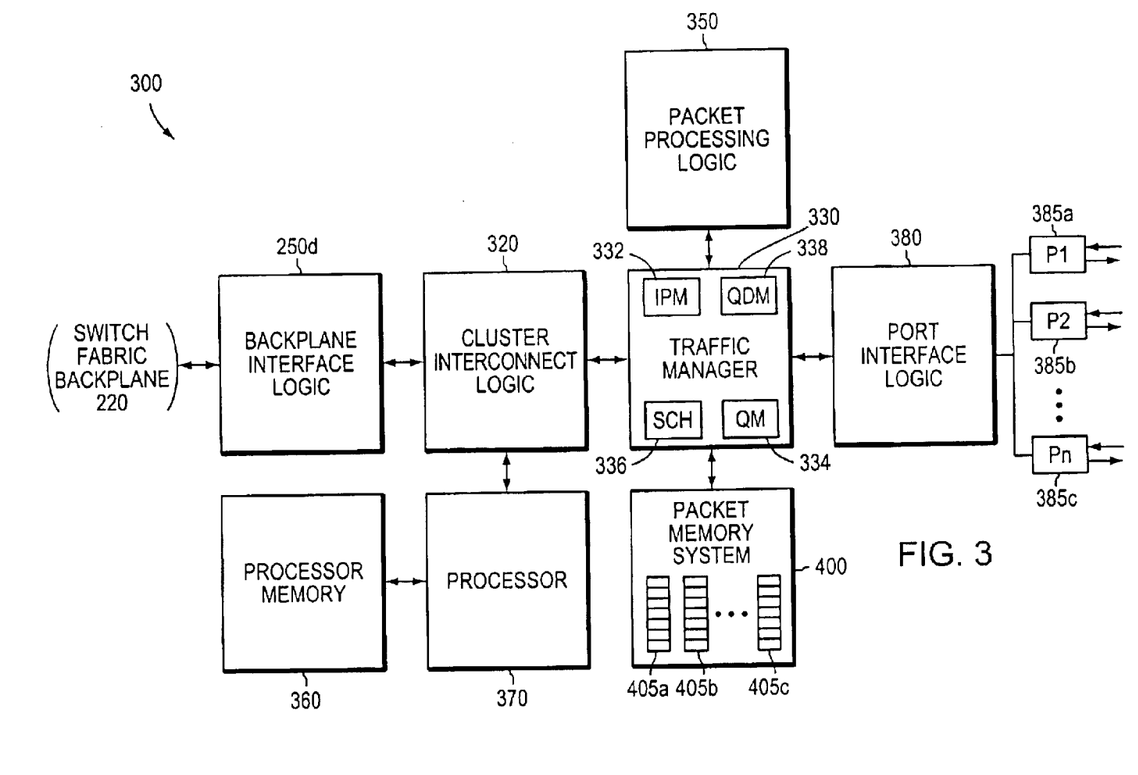
FIG. 3 is a partial schematic block diagram of a network services engine (NSE) of the intermediate network node.

The NSE 300 is adapted to provide processing of incoming and outgoing packets. FIG. 3 is a partial block diagram of NSE 300 comprising backplane interface logic 250*d*, cluster interconnect logic 320, processor 370, processor memory 360, packet processing logic 350, port interface logic 380, one or more physical ports 385, traffic manager 330 and packet memory system 400. The backplane interface logic 250*d* comprises logic that enables NSE 300 to communicate over the backplane 220. That is, the backplane interface logic 250*d* comprises logic that enables the NSE 300 to communicate with other cards connected to the backplane 220 using various data and control signals.

The processor 370 comprises processing elements and logic that are capable of executing instructions and generating memory requests. An example of a processor that may be advantageously used with the invention is the BCM1250 processor available from Broadcom Corporation, Irving, Calif. The processor memory 360 is a computer readable medium that holds data and software routines containing executable program instructions. These data and software routines enable the processor 370 to perform various functions, such as managing switch 200, as well as route processing. The processor memory 360 may comprise one or more memory devices (not shown) that are capable of storing executable instructions and data. Illustratively, these memory devices are industry standard memory devices, such as Dynamic Random Access Memory (DRAM) devices available from Micron Technology, Inc., Boise, Id.

The cluster interconnect logic 320 comprises logic that interfaces the backplane interface logic 250*d* and the processor 370 with the traffic manager 330. Illustratively, the cluster interconnect is embodied in a Field Programmable Gate Array (FPGA) that is configured to enable the traffic manager 330 to transmit and receive data to and from the backplane 220 and the processor 370. The port interface logic 380 comprises logic that interfaces the traffic manager 330 to the physical ports 385. To that end, the port interface logic 380 includes logic that enables the traffic manager 330 to transmit and receive packets to and from the ports 385, respectively. The ports 385 comprise logic that physically interfaces the NSE 300 to the network 100.

The packet processing logic 350 comprises logic and processing elements that, inter alia, classify a packet that has been received by NSE 300. The packet processing logic 350 includes logic that is configured to examine packet headers of received packets and associate each packet with a first-in first-out (FIFO) "service" queue contained in the packet buffer 400. Illustratively, the packet processing logic 350 is embodied in a series of Application Specific Integrated Circuits (ASICs).

The traffic manager 330 comprises logic and memory elements that are configured to, inter alia, enqueue and dequeue packets to and from service queues 405 organized in the packet memory system 400. Moreover, the traffic manager 330 is configured to allocate and deallocate blocks of memory contained in an external memory of the packet memory system 400, and further issue commands to the packet memory system 400 that instructs that system 400 to write and read packets to and from the service queues 405. To that end, traffic manager 330 includes an internal packet memory (IPM) 332, a queue descriptor memory (QDM) 338, a scheduler (SCH) 336 and a queue manager (QM) 334.

The IPM 332 contains logic and memory elements that are used to temporarily hold packets received from the backplane 220 and the physical ports 385. The QDM 338 holds information specific to each of the queues 405. This information includes pointers to the head and tail of each queue 405, as well as the size of each queue. The scheduler 336 contains logic and processing elements that perform traffic management and shaping of traffic transmitted by the NSE 300 over the backplane 220 and ports 385. The queue manager 334 comprises logic and processing elements that, inter alia, manage each of the service queues 405 organized in the packet memory system 400. Preferably, the traffic manager 330 is configured to support 8192 (i.e., 8 k) service queues.

Figure 4:
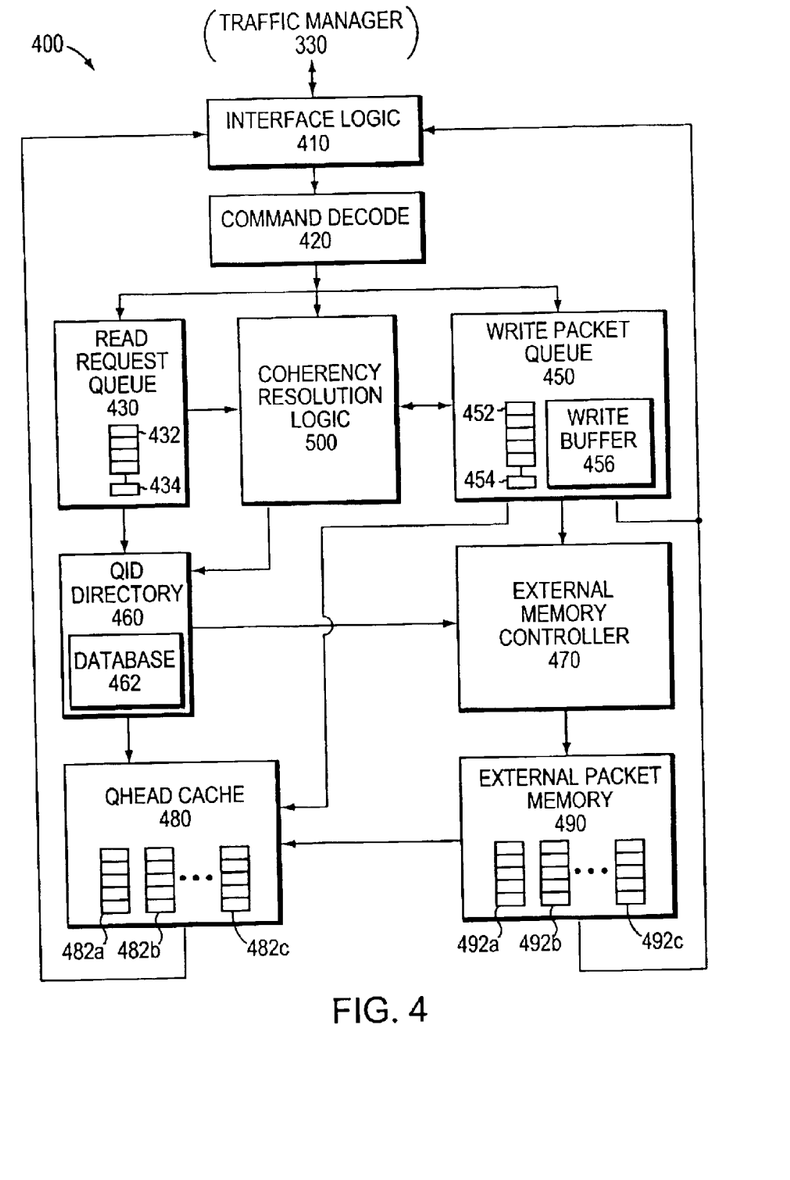
FIG. 4 is a schematic block diagram of a packet memory system of the NSE.

FIG. 4 is a schematic block diagram of packet memory system 400 comprising logic and memory elements that enable packets to be written and read to and from the service queues 405. The packet memory system 400 is configured to support 8*k* service queues, each queue 405 comprising a low-speed portion 492 and a high-speed portion 482, and each service queue associated with a queue identifier (QID). The packet memory system 400 comprises interface logic 410, command decode logic 420, read request queue logic 430, queue identifier (QID) directory 460, queue head (Qhead) cache 480, coherency resolution logic 500, write packet queue logic 450, external memory controller 470 and external memory 490. Illustratively, the interface logic 410, command decode logic 420, read request queue 430, QID directory 460, Qhead cache 480, coherency resolution logic 500, write packet queue logic 450 and external memory controller 470 may be embodied in one or more ASICs.

The interface logic 410 comprises logic that is configured to interface the packet memory system 400 to the traffic manager 330. To that end, the interface logic 410 illustratively comprises low voltage differential signaling (LVDS) input and output sections that generate the necessary data and control signals that enable requests and data to be transferred between the traffic manager 330 and packet memory system 400. The command decode logic 420 is connected to the interface logic 410, the read request queue logic 430, the coherency resolution logic 500 and the write packet queue logic 450, and comprises logic circuitry configured to process requests received at interface logic 410. If a read command is specified in the request, the logic 420 forwards the request to the read request queue logic 430; otherwise if a write command is specified, the logic 420 forwards the request and data to the write packet queue logic 450. In either event, the request is also forwarded to the coherency resolution logic 500, as described further herein.

The read request queue 430 comprises logic and memory elements that are configured to hold and process read command requests received by the command decode logic 420. The read request queue 430 comprises a read command queue 432 that holds the read commands and command decode logic 434 that is configured to process a read command when it reaches the head of the command queue 432. Illustratively, the read command queue 432 is a 32-entry by 72-bit FIFO queue that is configured to hold up to 32 read requests.

The QID directory 460 comprises logic and memory elements that are configured to, inter alia, issue requests to the external memory controller 470 and hold information specific to the service queues 405. The QID directory 460 issues read requests to external memory controller 470 to refill the Qhead cache 480 as directed by the read request queue 430 and write packet queue 450. Moreover QID directory 460 comprises a database 462 that is configured to hold information specific to the service queues 405. Illustratively, database 462 is organized as a series of 8 k entries where each entry is associated with a particular service queue 405.

The Qhead cache 480 comprises logic and memory elements configured to hold the high-speed portion 482 of service queue 405, which in the illustrative embodiment, is the first 1024 bytes at the head of the queue. Illustratively, Qhead cache 480 comprises high-speed, high-bandwidth embedded memory macros or external memory devices, such as Static Random Access Memory (SRAM) devices available from Micron Technology, Inc., Boise, Id. An example of a Qhead cache that may be advantageously used with the present invention is described in commonly assigned U.S. patent application Ser. No. (112025-0496) titled Caching Streaming Data, by Key et al., which application is hereby incorporated by reference as though fully set forth herein.

The external memory controller 470 comprises logic that is configured to process requests issued by the write packet queue logic 450 and QID directory logic 460. To that end, the external memory controller 470 contains logic that decodes requests and transfers data associated with those requests, preferably as 32-byte blocks, to and from the low-speed portions 492 of the service queues 405 contained in external memory 490. The external (packet) memory 490, in turn, comprises logic and memory elements that are configured to hold the low-speed portions 492 of the service queues 405, preferably as a series of one or more 4096 byte (4 kB) memory segments. Illustratively, the memory elements comprise high-density commodity memory devices, such as Reduced Latentcy DRAM (RLDRAM) devices available from Infineon Technologies Corporation, San Jose, Calif., that are capable of holding packet data.

The write packet queue 450 comprises logic and memory elements that are configured to hold and process write command requests and data received by the command decode logic 420. The write packet queue 450 comprises a write command queue 452 that holds the write commands, command decode logic 454 that is configured to process a write command when it reaches the head of the command queue 452 and a write buffer 456 that is configured to hold write data associated with the write commands in the command queue 452. Illustratively, the write command queue 452 is a 16-entry FIFO queue that is configured to hold up to 16 write requests.

The size of the write buffer is dependent on, among other things, the amount and size of generated network data traffic, i.e., packets. For an intermediate network node having, e.g., OC-192 class interfaces, network data traffic is generated at the rate of up to 50 million packets per second (PPS), thus requiring a relatively large write buffer to process streams of incoming write packet data and outgoing read packet data to and from the external packet memory 490. For packet sizes greater than 64 bytes, performance is not an issue because packets can easily flow in and out of memory. However with smaller packet sizes, such as 32 or 64 bytes, the access operating cycle time of the external packet memory becomes significant.

In the illustrative embodiment, the size of the write buffer is 2 kilobytes (kB), the size of the external packet memory is 256 megabytes (MB) and the operating cycle time of the packet memory is 2.5 nanoseconds. It should be noted that the size of the write buffer could range from 2 kB to 8 kB and the size of the external packet memory could increase to 512 MB, to support a network traffic rate of 200 milliseconds of buffering. As noted, the write buffer 456 stores the write data in 32-byte blocks to conform to a predetermined particle size of the external packet memory 490. The block size (32B) is used when transferring data between the external memory controller 470 and the external packet memory. Thus, when incoming write data is received at the write buffer of the packet memory system 400, that data is apportioned into 32B blocks when subsequently transferred from the write buffer 456 to the external packet memory.

Assume incoming packets of random sizes are received from the network 100 by the source line cards 210 and sent over the backplane 220 to NSE 300 where they are received by the backplane interface logic 250*d* and transferred through the cluster interconnect logic 320 to the traffic manager 330 for further processing. Alternatively, the packets are received from the network 100 by the physical ports 385 and transferred to the traffic manager 330 through the port interface logic 380. The traffic manager 330 stores each packet in the IPM 332 and notifies the packet processing logic 350. The packet processing logic 350 classifies and assigns QIDs to these incoming packets based on, e.g., their transmission rates, their routed destinations and priority. To that end, the packet processing logic examines headers of the packets, selects service queues 405 that are to receive the packets and conveys the QIDs of the selected service queues to the queue manager 334 for enqueuing operations.

The queue manager (requestor) allocates, as necessary, one or more blocks of the external packet memory 490, associates the allocated blocks with the QIDs and issues one or more write command requests to the packet memory system 400 to place the packets in the allocated external packet memory. These write requests are enqueued on the write command queue 452, while the write data associated with those requests are stored in the write buffer 456 until that data is "retired" to the memory 490. Enqueuing of the packets into the packet memory system 400 has no defined order or form other than, e.g., first come first served in order to place the packets into their assigned service queues in the external packet memory 490. Note that some packets may be dropped before reaching the packet memory system if they get over-subscribed. As a result of the random packet sizes and enqueuing events, packets from various QIDs are interspersed among each other in the write command queue 452 (and write buffer 456); notably, though, packets from the same QID are always organized in strict time sequence order as they appear in the queue 452.

Thereafter, the queue manager 334 notifies the scheduler 336 to schedule a packet for dequeuing. When the packet is to be dequeued, the scheduler 336 notifies the queue manager 334 that, in turn, issues a read command request to the packet memory system 400 to dequeue the packet for transmission over the backplane 220 or over a physical port 385. Illustratively, the queue manager 334 dequeues packet data in large chunks at a time, e.g., multiples of 512 bytes (B) that, in some situations, may comprise multiple packets. The write data in the write buffer 456 is subject to a coherency checking operation to determine if any of its enqueued data can be used to service this read request. If data in the write buffer is needed to service the request, it is desirable to dequeue (retrieve) that data and return it to the queue manager in an efficient manner, i.e., without having to perform a series of 32-byte coherency checking operations conforming to the memory particle size, which is time consuming and inefficient.

In the illustrative embodiment, there are 4 kB memory segments organized as queues within the external packet memory and Qhead cache, wherein the segments are dedicated to service queues 405. The queue manager 334 allocates a 4 kB segment of memory at a time that is used exclusively by a service queue. The queue manager also issues dequeue (read) commands in large chunks, e.g., 512 bytes at a time, that may comprise multiple packets. As described herein, the present invention exploits this data transfer and storage arrangement to enable execution of coherency operations in an efficient manner. That is, rather than check coherency on memory particle size, e.g., 32-byte granularities, the packet memory system exploits the "bulk transfer" ability for each service queue to transfer multiple streams of packets to perform a single address range (address and length) comparison up to the maximum size of the write buffer. Since the size of the write buffer is illustratively 2 kB, that amount of data can be transferred from the write buffer in one coherency checking operation.

Specifically, the present invention is directed to a technique that enables efficient resolution of data coherency for packet data associated with a service queue of an intermediate network node. The packet data is enqueued on the write buffer prior to being stored on the external packet memory. The packet data may be interspersed among other packets of data from different service queues, wherein the packets are of differing sizes. In response to a read request for the packet data, a coherency operation is performed by the coherency resolution logic on the data in the write buffer to determine if any of its enqueued data can be used to service the request.

Figure 5:
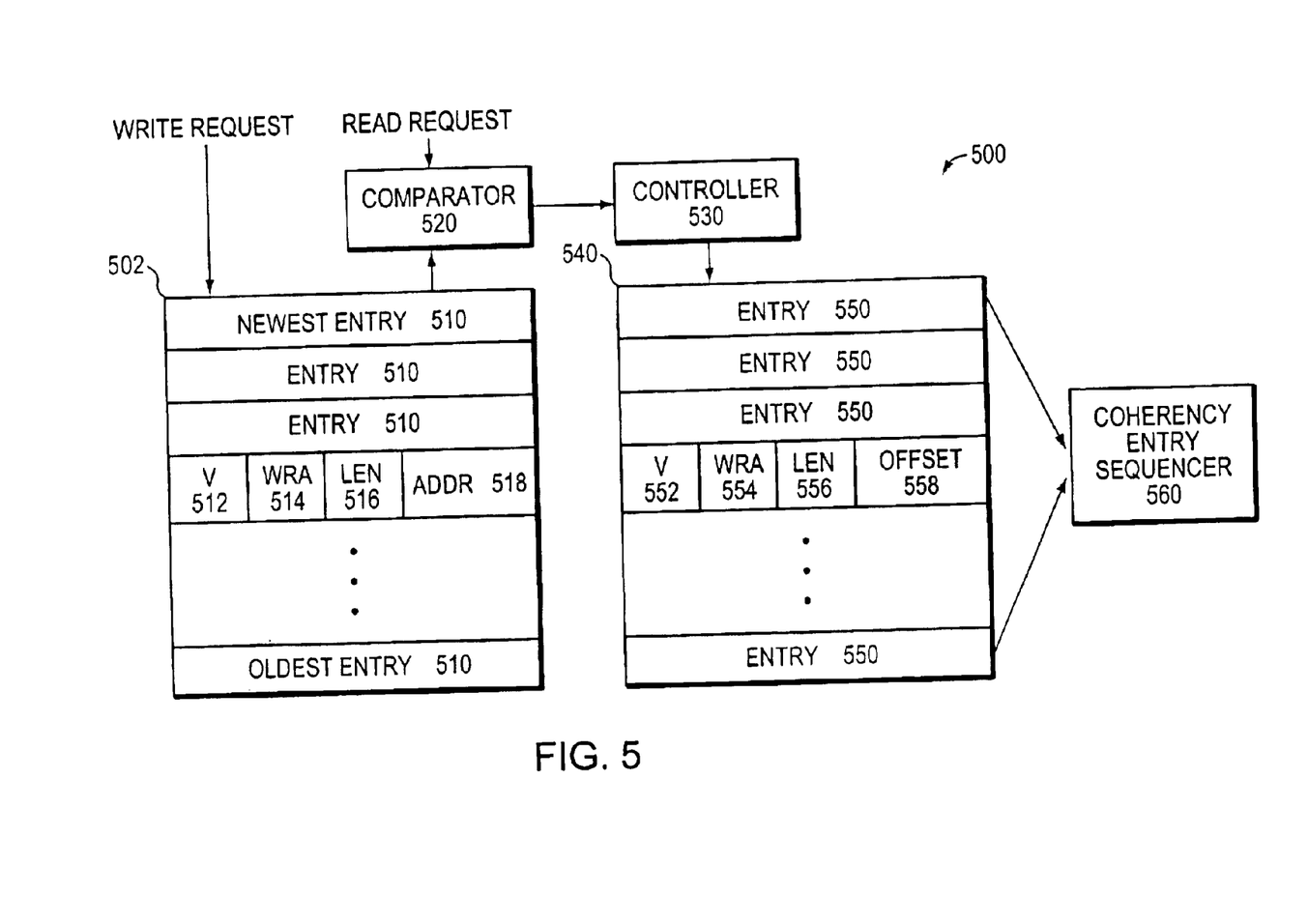
FIG. 5 is a schematic block diagram of coherency resolution logic of the present invention.

FIG. 5 is a schematic block diagram of the coherency resolution logic 500 of the present invention. The coherency resolution logic includes a coherency table 502 having a plurality of entries 510, wherein the number of entries is based on the number of outstanding packets supported by the write buffer. In the illustrative embodiment, the coherency table has sixteen (16) entries 510. Each entry 510 comprises a valid (V) field 512 containing a valid bit that indicates whether the entry is active (valid) and a buffer pointer or write register address (WRA) field 514 containing a pointer that references a starting location of the write data in the write buffer 456. A length (len) field 516 contains a length (size) value that indicates the length of the packet data for a write command associated with that entry. Note that the packet length may be determined in accordance with a conventional n+1 scheme, wherein each count represents the memory particle size, e.g., 32 bytes. Each entry 510 further includes a memory address (addr) field 518 containing a write address to which a write request is directed in the external packet memory 490. In the illustrative embodiment, the write command queue 452 of the write packet queue logic 450 may be implemented as part of the coherency table 502.

The coherency resolution logic 500 also includes a length and address comparator 520 and a coherency resolution controller 530. The comparator 520 illustratively comprises conventional comparison logic adapted to compare the length and address of each read command request received at the packet memory system 400 with the contents of the len field 516 and addr field 518 of each entry 510 in the coherency table 502. The length and address are used in the comparison operation because there may be situations where only a portion of the packet (i.e., a partial packet) is stored in the write buffer 456. The controller 530 is illustratively implemented as a plurality of hardware registers and combinational logic configured to produce a sequential logic circuit, such as a state machine, adapted to control the operations of the coherency resolution logic 500.

In addition, the coherency resolution logic 500 includes a snapshot table 540 that provides an identical recording of a current instance of the coherency table entries 510. That is, the snapshot table 540 provides a means for capturing an instance of the information needed to perform a coherency operation, while enabling the coherency table 502 to continue to (i) accept incoming write command requests if there are available ("free") entries to accommodate those requests and (ii) direct those write requests to the external packet memory 490 as the coherency operation (resolution) progresses. The snapshot table 540 has a plurality (e.g., 16) of entries 550, each comprising a valid (V) field 552 containing a valid bit that indicates whether the entry is active (valid) and a WRA field 554 containing a write pointer that references a starting location of the write data in the write buffer 456. A length (len) field 556 contains a length (size) value that indicates the length of the packet data for the write command of that entry and an offset field 558 contains an offset into the write buffer that references write data representing a partial packet.

According to the invention, the snapshot table 540 is created in response to a coherency situation (conflict) involving an incoming read command request and pending write command request at the packet memory system 400. As noted, the comparator 520 compares the length and address of the incoming read request with the contents of the len field 516 and addr field 518 of each entry 510 in the coherency table 502 to determine whether there is a match (i.e., a coherency conflict). If there is a conflict, then the coherency resolution controller 530 performs a copy, i.e., a "snapshot", operation to create a snapshot of all current entries (i.e., that instance) of the coherency table 502. The snapshot operation results in the creation of the 16-entry snapshot table 540.

The coherency conflict arises if there are one or more matching entries of the coherency table 502. For example, if the appropriate contents of coherency table entry 15 match the appropriate contents of the incoming read request, a snapshot (copy) is made of all 16 entries of the table 502 and these copied entries are stored in the snapshot table 540. Only the one matching entry (15) of the snapshot table is marked valid for the coherency operation; all of remaining fifteen entries (0–14) are marked invalid. When the coherency resolution operation is invoked, only those entries marked valid are considered. All invalid entries are skipped over or discarded.

It should be noted that when the snapshot table 540 is created, there may be entries 510 of the coherency table 502 that are not filled with valid write requests and those entries can be used to store additional incoming requests. Note also that in response to creation of the snapshot table 540, the current entries of the coherency table 502 are not invalidated, but are maintained to ensure subsequent writing (storing) of the write data corresponding to the commands represented in those entries to external packet memory 490. In this manner, the snapshot table 540 allows resolution of coherency operations without stalling the write command queue/coherency table and the write buffer from accepting additional packet data.

Once the snapshot table is created, the coherency resolution controller 530 searches for the write pointers in WRA fields 554 of the valid entries in the table 540 and calculates the offsets (fields 558) into the write buffer 456. The controller then initiates transfer of the relevant write data from the write buffer locations referenced by those write pointers of the valid entries in the snapshot table 540. The contents of the WRA and length fields 554, 556 reference that write data; if the data represents a partial packet, that data is referenced by the offset in field 558. In the case of a partial packet, some of the data may be present in the Qhead cache 480 with the remaining data being present in either the write buffer 456 or the external packet memory 490.

As is the case with the write command queue 452, packets are enqueued in the coherency table 502 in strict order for each service queue (QID). Thus, when dequeuing multiple packets at a time, it is desirable to ensure that those packets are returned to the requestor (e.g., queue manager) in the correct order. A coherency entry sequencer 560 ensures that the order of packets represented in the snapshot table 540 is the order of write data retrieved from the write buffer 456. Strict ordering is important because the coherency table entries 510 are not marked by, e.g., sequence numbers to maintain order. Thus, the order of packets queued in the packet memory system (per service queue) is the order in which they are returned to the queue manager.

Operationally and in response to a read (dequeue) request, the read request queue 430 cooperates with the QID directory 460 and external memory controller 470 to perform a read operation to the specified address in the external packet memory 490. In parallel, the coherency resolution controller 530 performs a coherency operation on the coherency table/snapshot table to determine whether there is ("fresh") data in the write buffer 456 that is queued for storage at the specified packet memory address and that makes the data stored at that address "stale". Notably, the packet memory system 400 attempts to service the read request from the Qhead cache 480 first and, if there is any remaining data, it is retrieved from the external packet memory unless the coherency operation indicates that the data in the packet memory is stale. If the coherency operation determines that the data in the external packet memory is stale, the fresh packet data is retrieved from the write buffer and forwarded to the output section of the interface logic 410. The interface logic then assembles the data responsive to the read request and returns that data to the requester, while the stale data retrieved from the external packet memory is discarded.

In essence, the novel coherency resolution technique is performed on a service queue basis to maintain order of packets on each service queue. If data is requested from multiple service queues, the requests are handled sequentially with coherency resolution being handled sequentially per service queue. That is, a coherency operation is processed fully for packets of each service queue request, one at a time, before moving on to the next service queue. Even though a copy of the coherency table is made, i.e., the snapshot table 540, the entries 510 of the coherency table 502 are maintained to ensure that the corresponding data in the write buffer 456 is written to the Qhead cache 480 and to the external packet memory 490.

Figure 6:
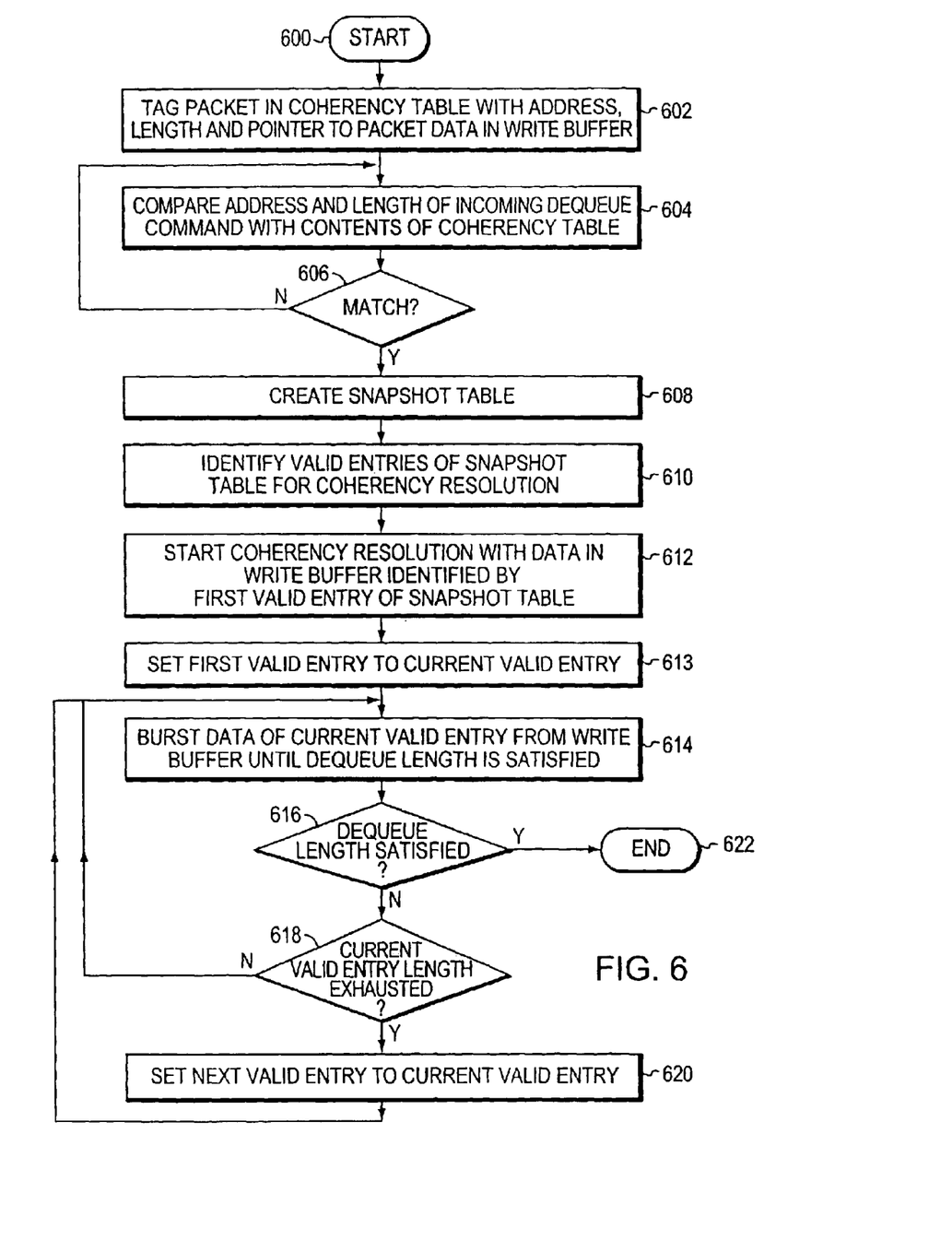
FIG. 6 is a flowchart illustrating a sequence of steps for ensuring efficient resolution of data coherency for packet data associated with a service queue of the intermediate network node in accordance with the present invention.

FIG. 6 is a flowchart illustrating a sequence of steps for ensuring efficient resolution of data coherency for packet data associated with a service queue of the intermediate network node 200. The sequence starts at Step 600 and proceeds to Step 602 where a packet associated with a write request directed to the service queue is "tagged" (identified) in the write command queue/coherency table with a write address, a length of the packet data and a pointer that references the starting location of the packet data in the write buffer. In response to an incoming dequeue command, a range comparison operation is performed that enables interrogation of the coherency table on the basis of dequeue address and length (Step 604). In Step 606, a determination is made as to whether the dequeue address and length fall within (match) the range of addresses and lengths stored in the entries of the coherency table. If not, the sequence returns to Step 604; otherwise, a snapshot of the coherency table (i.e., a snapshot table) is created in Step 608.

In Step 610, valid entries of the snapshot table involved in the coherency resolution are identified. In Step 612, coherency resolution starts (initiates) with the data in the write buffer identified in the first valid entry of the snapshot table by the write pointer (or offset in the write buffer) and the length of the enqueued packet stored therein. The first valid entry is then set to the current valid entry of the snapshot table (Step 613). In Step 614, coherency data (as identified by the current valid entry in the snapshot table) is seamlessly burst from the write buffer and transferred to the requestor until the dequeue length is satisfied. In Step 616, a determination is made as to whether the dequeue length is satisfied and, if so, the sequence ends at Step 622. Otherwise, a determination is made in Step 618 as to whether the current valid entry length is exhausted. If not, the sequence returns to Step 614. However, if the current valid entry length is exhausted, the next valid entry is set to the current valid entry in Step 620 and the sequence returns to Step 614.

It should be also noted that the coherency table 502 always identifies entries with data equal to or more than the dequeue amount. This is because a first part of the dequeue process from the queue manager 334 is a fixed amount of data that may result in a partial packet in an end portion, whereas a second part of the process is directed to dequeuing just enough data to complete that partial packet. Nevertheless, if all entries 550 in the snapshot table 540 are exhausted before satisfying the dequeue length, an error occurs with respect to dequeuing packet data that has not been enqueued. In addition, it should be noted that any interspersed packets from other service queues in the write buffer that are not involved in the coherency resolution are skipped or discarded. Thus only the relevant (matching) identified entries of the snapshot table are processed by the coherency operation.

In sum, coherency resolution checking is performed on a range of addresses rather than at memory particle size, e.g., 32-byte, granularities. Where the range of addresses includes multiple packets, coherency resolution is performed for the multiple packets in a "seamless" manner. That is, once data corresponding to a packet in the range of matching addresses is retrieved from the write buffer, the data of a next packet in the write buffer is immediately retrieved without any pause or gaps between retrievals. Rather than tagging the enqueue data on the memory particle size granule, the coherency resolution logic interrogates the write buffer once and seamlessly bursts relevant data from the write buffer at maximum rate until the entire requested data is satisfied.

Specifically, coherency checking does not have to be performed on the memory particle size granularity because each enqueue command issued to the packet memory system for a packet of a service queue has a starting address and length, and the corresponding data is stored contiguously in the write buffer (and memory). When a next packet arrives for the same service queue, that packet is stored in a location following the previous packet of that service queue. Thus, in response to a dequeue command for a packet, the novel technique enables efficient resolution of data coherency even though there may be other service queue packets interspersed in the write buffer that are destined for other memory locations. As a result, the inventive technique simplifies data coherency and reduces the impact on performance that typically occurs with coherency operations.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A method for enabling efficient resolution of data coherency in an intermediate network node, the method comprising the steps of:
    enqueuing packet data on a write buffer of a packet memory system in response to a write request to store the packet data on a service queue, the packet data interspersed among other packets of data from different service queues, wherein the packets are of differing sizes;
    tagging the write request in a coherency table having a plurality of entries, each coherency table entry containing a write address, a length of the packet data and a pointer that references a starting location of the packet data in the write buffer;
    issuing a read request for the packet data, the read request having a dequeue address and dequeue length; and
    performing a range comparison operation that interrogates the coherency table using the dequeue address and length to determine if the enqueued data can be used to service the read request.

2. The method of claim 1 wherein the step of performing comprises the step of determining whether the dequeue address and length match a range of addresses and lengths stored in the entries of the coherency table.

3. The method of claim 2 further comprising the step of, if the dequeue address and length match a range of addresses and lengths stored in the entries of the coherency table, creating a snapshot table that provides a recording of a current instance of the coherency table entries.

4. The method of claim 3 wherein the snapshot table comprises a plurality of entries, each snapshot table entry containing a length of the packet data, a pointer that references a starting location of the packet data in the write buffer and an offset into the write buffer that references the packet data representing a partial packet.

5. The method of claim 4 further comprising the steps of:
    identifying valid entries of the snapshot table; and
    initiating coherency resolution with the packet data in the write buffer identified in a first valid entry of the snapshot table by the write pointer or offset in the write buffer and the length of the packet data.

6. The method of claim 5 further comprising the steps of:
    setting the first valid entry of the snapshot table to a current valid entry; and
    bursting the packet data as identified by the current valid entry in the snapshot table from the write buffer until the dequeue length is satisfied.

7. The method of claim 6 further comprising the steps of:
    determining whether the dequeue length is satisfied;
    if not, determining whether the packet data length of the current valid entry is exhausted;
    if so, setting the next valid entry of the snapshot table to the current valid entry; and
    bursting the packet data as identified by the current valid entry in the snapshot table from the write buffer until the dequeue length is satisfied.

8. A system adapted to enable efficient resolution of data coherency for a read request to dequeue packet data associated with a service queue in an intermediate network node, the system comprising:
    a write buffer configured to bold write data associated with one or more write requests to store the write data on the service queue, the write data including the packet data; and
    coherency resolution logic configured to perform a coherency resolution operation on the write data in the write buffer to determine if that data can be used to service the read request, the coherency resolution logic including a coherency table having a plurality of entries, each associated with a write request and corresponding write data for a packet or portion of a packet.

9. The system of claim 8 wherein each coherency table entry comprises a write address write address to which the write request is directed in an external packet memory, a length of the packet data and a pointer that references a starting location of the packet data in the write buffer.

10. The system of claim 9 further comprising a snapshot table configured to enable coherency resolution when an address and length of the read request matches the write address and length contained in a coherency table entry.

11. The system of claim 10 wherein the snapshot table captures an instance of the coherency table entries needed to perform a coherency operation, while enabling the coherency table to continue to (i) accept write requests if there are available entries to accommodate those requests and (ii) direct those write requests to the external packet memory as the coherency operation progresses.

12. The system of claim 10 wherein the snapshot table comprises a plurality of entries, each snapshot table entry containing a length of the packet data, a pointer that references a starting location of the packet data in the write buffer and an offset into the write buffer that references the packet data representing a partial packet.

13. The system of claim 12 further comprising a length and address comparator adapted to compare the address and length of the read request with the write address and length of each coherency table entry.

14. The system of claim 13 further comprising a coherency resolution controller adapted to control operations of the coherency resolution logic.

15. A system adapted to enable efficient resolution of data coherency in an intermediate network node, the system comprising:
    a write buffer configured to hold write data associated with one or more write requests to store the write data on a service queue, the write data including packet data;
    coherency resolution logic configured to perform a coherency resolution operation on the write data in the write buffer to determine if that data can be used to service a read request to dequeue the packet data, the coherency resolution logic including a coherency table having a plurality of entries, each entry associated with a write request and corresponding write data for a packet or portion of a packet, each entry including a write address, a length of the packet data and a pointer that references a starting location of the packet data in the write buffer; and
    a snapshot table configured to enable coherency resolution when an address and length of the read request matches the write address and length contained in a coherency table entry.

16. Apparatus for enabling efficient resolution of data coherency in an intermediate network node, the apparatus comprising:
    means for enqueuing packet data on a write buffer of a packet memory system in response to a write request to store the packet data on a service queue, the packet data interspersed among other packets of data from different service queues, wherein the packets are of differing sizes;
    means for tagging the write request in a coherency table having a plurality of entries, each coherency table entry containing a write address, a length of the packet data and a pointer that references a starting location of the packet data in the write buffer;

means for issuing a read request for the packet data, the read request having a dequeue address and dequeue length; and means for performing a range comparison operation that interrogates the coherency table using the dequeue address and length to determine if the enqueued data can be used to service the read request.

17. The apparatus of claim 16 wherein the means for performing comprises means for determining whether the dequeue address and length match a range of addresses and lengths stored in the entries of the coherency table.

18. The apparatus of claim 17 further comprising, if the dequeue address and length match a range of addresses and lengths stored in the entries of the coherency table, means for creating a snapshot table that provides a recording of a current instance of the coherency table entries.

19. A computer readable medium containing executable program instructions for enabling efficient resolution of data coherency in an intermediate network node, the executable program instructions comprising program instructions for:

enqueuing packet data on a write buffer of a packet memory system in response to a write request to store the packet data on a service queue, the packet data interspersed among other packets of data from different service queues, wherein the packets are of differing sizes;

tagging the write request in a coherency table having a plurality of entries, each coherency table entry containing a write address, a length of the packet data and a pointer that references a starting location of the packet data in the write buffer;

issuing a read request for the packet data, the read request having a dequeue address and dequeue length; and performing a range comparison operation that interrogates the coherency table using the dequeue address and length to determine if the enqueued data can be used to service the read request.

20. The computer readable medium of claim 19 wherein the program instruction for performing comprises one or more program instructions for determining whether the dequeue address and length match a range of addresses and lengths stored in the entries of the coherency table.

21. The computer readable medium of claim 20 further comprising one or more program instructions for, if the dequeue address and length match a range of addresses and lengths stored in the entries of the coherency table, creating a snapshot table that provides a recording of a current instance of the coherency table entries.

* * * * *